(12) United States Patent
Eschebach et al.

(10) Patent No.: US 7,322,630 B2
(45) Date of Patent: Jan. 29, 2008

(54) VEHICLE TAILGATE LIFT ASSIST SUPPORT STRUCTURE

(75) Inventors: Richard Eschebach, Grosse Point Shores, MI (US); William Bowes, Macomb, MI (US); Nandkumar Rangnekar, Sterling Heights, MI (US); Rahul Joshi, Farmington Hills, MI (US); Robert Gaines, Waterford, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/637,186

(22) Filed: Dec. 12, 2006

(65) Prior Publication Data

US 2007/0145761 A1    Jun. 28, 2007

Related U.S. Application Data

(62) Division of application No. 11/077,112, filed on Mar. 11, 2005, now Pat. No. 7,147,260.

(51) Int. Cl.
    *B62D 25/00* (2006.01)
(52) U.S. Cl. ........................................ 296/57.1; 296/56
(58) Field of Classification Search ............... 296/57.1, 296/56; 49/386, 340, 280, 26, 28
    See application file for complete search history.

(56) References Cited

U.S. PATENT DOCUMENTS

| 3,336,070 | A | * | 8/1967 | Jackson ..................... 296/57.1 |
| 3,398,985 | A | * | 8/1968 | Rhoades ..................... 296/57.1 |
| 4,206,944 | A | * | 6/1980 | Kumagai et al. ............. 296/76 |
| 5,234,249 | A | * | 8/1993 | Dorrell ....................... 296/57.1 |
| 5,271,652 | A | * | 12/1993 | Watanabe et al. .......... 296/57.1 |
| 5,449,212 | A | * | 9/1995 | Seifert ....................... 296/57.1 |
| 6,055,776 | A | * | 5/2000 | Dettling et al. ............... 296/56 |
| 6,202,350 | B1 | * | 3/2001 | Montgomery et al. ........ 49/139 |
| 6,217,097 | B1 | * | 4/2001 | Rogers et al. ............. 296/57.1 |
| 6,357,813 | B1 | * | 3/2002 | Vandeberghe et al. ..... 296/57.1 |
| 6,637,796 | B1 | | 10/2003 | Westerdale et al. |
| 6,773,047 | B2 | | 8/2004 | Gruber |
| 6,793,263 | B1 | | 9/2004 | Bruford et al. |
| 6,820,910 | B1 | | 11/2004 | Tan et al. |
| 6,820,920 | B2 | * | 11/2004 | Maeda .................... 296/146.8 |
| 6,832,801 | B2 | | 12/2004 | Zagoroff |
| 6,846,030 | B2 | | 1/2005 | Koehler et al. |
| 6,994,390 | B2 | * | 2/2006 | Zagoroff .................... 296/57.1 |
| 7,000,563 | B2 | * | 2/2006 | Hensel ....................... 116/35 R |

\* cited by examiner

*Primary Examiner*—Kiran B. Patel
(74) *Attorney, Agent, or Firm*—Global IP Counselors, LLP

(57) ABSTRACT

A vehicle tailgate lift assist support structure is disclosed that includes a vehicle rear end structure, a vehicle tailgate and a lift assist device. The vehicle rear end structure includes first and second walls that extend generally perpendicular to one another. A hinge reinforcement bracket has first and second reinforcing parts. The first reinforcing part is fastened on the first wall and the second reinforcing part is fastened on the second wall. A vehicle tailgate is pivotally coupled to the hinge reinforcement bracket and the rear end structure to open and close by rotation about a tailgate pivot axis. A lift assist device is operably connected to the tailgate hinge and the vehicle rear end structure to dampen opening movement and to apply a closing torque to tailgate hinge during closing movement of the vehicle tailgate.

9 Claims, 20 Drawing Sheets

VEHICLE TAILGATE LIFT ASSIST SUPPORT STRUCTURE

CROSS-REFERENCE TO RELATED APPLICATIONS

This application is a divisional application of U.S. patent application Ser. No. 11/077,112 filed on Mar. 11, 2005, now U.S. Pat. No. 7,147,260. The entire disclosure of U.S. patent application Ser. No. 11/077,112 is hereby incorporated herein by reference.

BACKGROUND OF THE INVENTION

1. Field of the Invention

The present invention generally relates to a vehicle tailgate lift assist support structure. More specifically, the present invention relates to a vehicle tailgate lift assist support structure that is reinforced and concealed within a taillight assembly receiving recess.

2. Background Information

Pickup trucks typically have a bed with a tail gate that is pivotally attached to a pair of side body structures. Some of these tailgates of the larger pickup trucks can be fairly heavy, and thus, making them difficult to open and close. In order to make the tailgate easier to open and close, several lift assist mechanisms have been proposed.

One example of a tailgate provided with a lift assist mechanism is disclosed in U.S. Pat. No. 6,773,047. The lift assist mechanism discloses in this patent uses a compressible cylinder that is coupled to the hinge of the tailgate to assist in lifting the tailgate. When a compressible cylinder is used to assist in lifting the tailgate, one problem is that additional forces are applied to the structure that supports such devices and the tailgate. In other words, the sheet metal portions of vehicles supporting the tailgate may not be sufficiently reinforced to withstand the additional forces resulting from using a compressible cylinder to open and close the tailgate. Moreover, when using a compressible cylinder to assist in lifting the tailgate, it may be difficult to mount the compressible cylinder in a location that is easy to access for assembling and servicing the compressible cylinder.

In view of the above, it will be apparent to those skilled in the art from this disclosure that there exists a need for an improved support structure within vehicles that employ such lift assist devices. This invention addresses this need in the art as well as other needs, which will become apparent to those skilled in the art from this disclosure.

SUMMARY OF THE INVENTION

It has been discovered that reinforcement is needed in those areas within a vehicle include support lift assist devices.

Accordingly, it is an object of the present invention to a vehicle with a tailgate lift assist support structure that can withstand the forces resulting from the inclusion and use of a lift assist device for a vehicle tailgate.

In accordance with one aspect of the present invention, a vehicle tailgate lift assist support structure includes a vehicle rear end structure, a taillight assembly, a vehicle tailgate and a lift assist device. The vehicle rear end structure includes a taillight receiving recess and a tailgate support structure. The taillight assembly is detachably disposed in the taillight receiving recess of the vehicle rear end structure. The vehicle tailgate is pivotally coupled to the tailgate support structure to open and close by rotation about a tailgate pivot axis. The lift assist device is located entirely within the taillight receiving recess. The lift assist device includes a first connection that is coupled to the vehicle tailgate. A second connection of the lift assist device is coupled to an interior surface within the taillight receiving recess. The lift assist device is configured to dampen opening movement of the vehicle tailgate relative to the vehicle rear end structure and to apply a closing torque to the vehicle tailgate during closing movement of the vehicle tailgate relative to the vehicle rear end structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
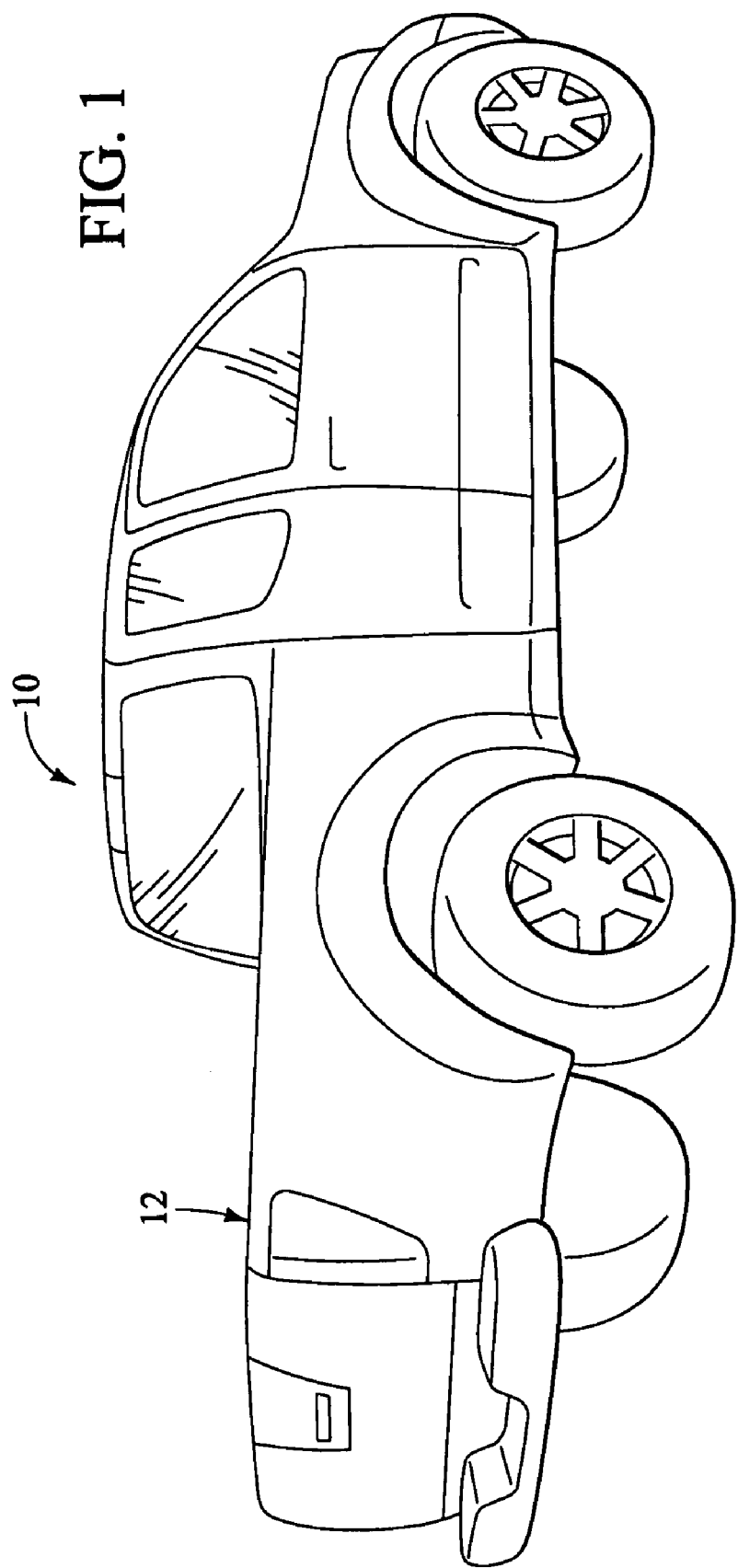
FIG. 1 is a rear perspective view of a vehicle having a vehicle tailgate lift assist support structure in accordance with the present invention.

Referring initially to FIG. 1, a vehicle 10 is illustrated that includes a vehicle tailgate lift assist support structure 12 in accordance with a first embodiment of the present invention. The vehicle 10 includes many conventional components, such as suspension, drive train and body components that are well known in the art. Since these components are well known in the art, these structures will not be discussed or illustrated in detail herein.

As shown in FIGS. 2-5, the vehicle tailgate lift assist support structure 12 includes portions of a rear end structure 14, a taillight assembly 16, a vehicle tailgate 18 and a lift assist device 20. In a preferred embodiment of the present invention, only one lift assist device 20 is employed along with the vehicle tailgate lift assist support structure 12 as described below. Although description of one side of the vehicle 10 employing the lift assist device 20 is provided below, description of one side can apply to both sides in the event that two lift assist devices 20 are employed, as should be apparent to one of ordinary skill in the art from description below and the accompanying figures.

The rear end structure 14 basically includes a side panel 22 formed with a taillight receiving opening 23 (FIG. 3), a taillight receiving recess 24 and a tailgate support structure 26 (FIGS. 4 and 5) in accordance with the present invention. As can be understood from the drawings and the description of the present invention below, various sheet metal portions and elements of the vehicle tailgate lift assist support structure 12 are common to both the taillight receiving recess 24 and the tailgate support structure 26.

Figure 2:
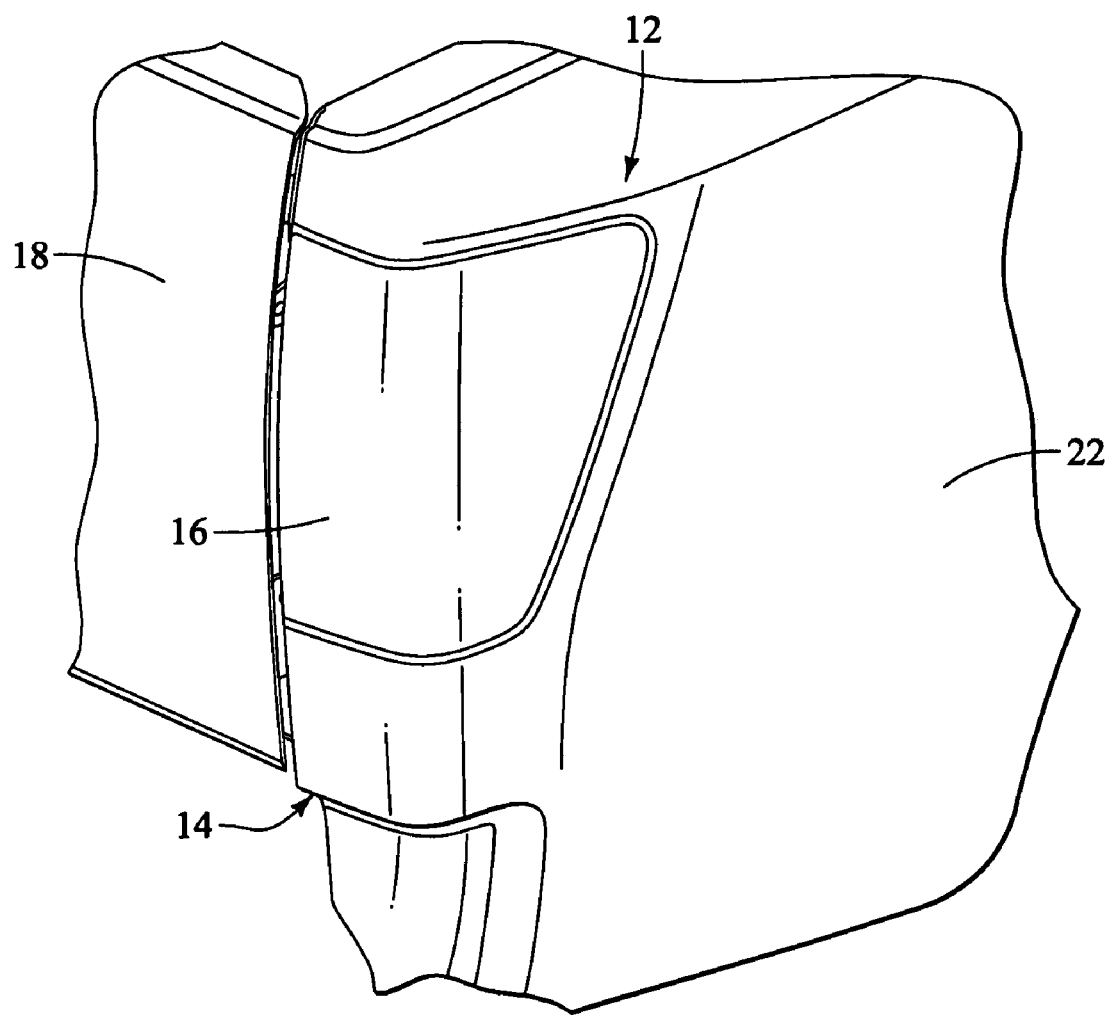
FIG. 2 is a partial perspective view of a rear portion of the vehicle shown in FIG. 1, showing a taillight assembly that conceals a lift assist device and the vehicle tailgate lift assist support structure in accordance with the present invention.
Figure 3:
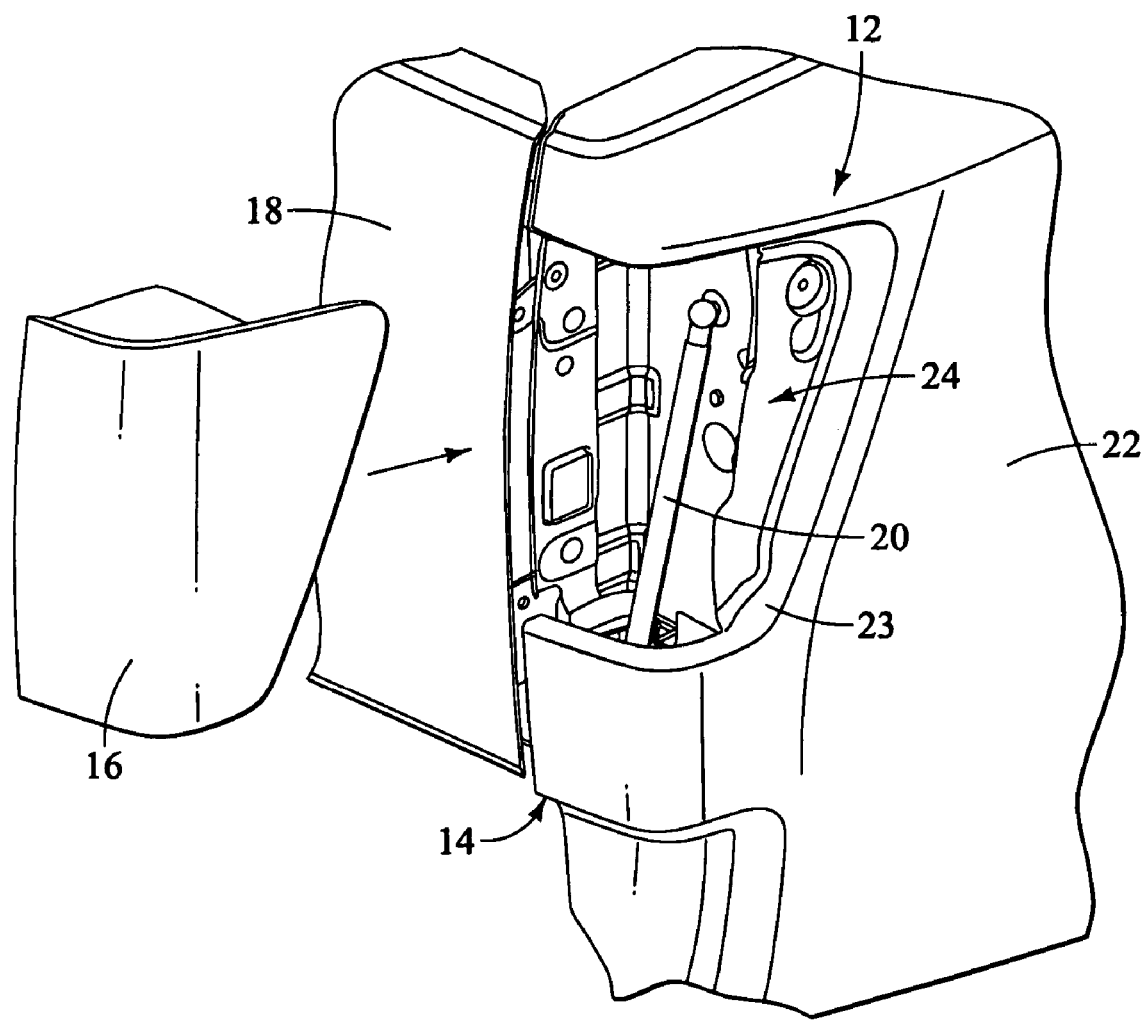
FIG. 3 is another perspective view of the rear portion of the vehicle with the taillight assembly removed to reveal a taillight receiving recess and portions of the vehicle tailgate lift assist support structure disposed within taillight receiving recess in accordance with the present invention.

As shown in FIGS. 2 and 3, the taillight assembly 16 removably fits in the taillight receiving opening 23 and extends into the taillight receiving recess 24. The taillight assembly 16 is removable from the taillight receiving recess 24 exposing the lift assist device 20 and various elements of the tailgate lift assist support structure 12. Further, with the taillight assembly 16 completely installed in the taillight receiving recess 24 thereby covering the taillight receiving opening 23, the lift assist device 20 is completely concealed, as indicated in FIG. 2. As more clearly understood from the description below and the drawings, the lift assist device 20 is entirely disposed within the taillight receiving recess 24.

Figure 4:
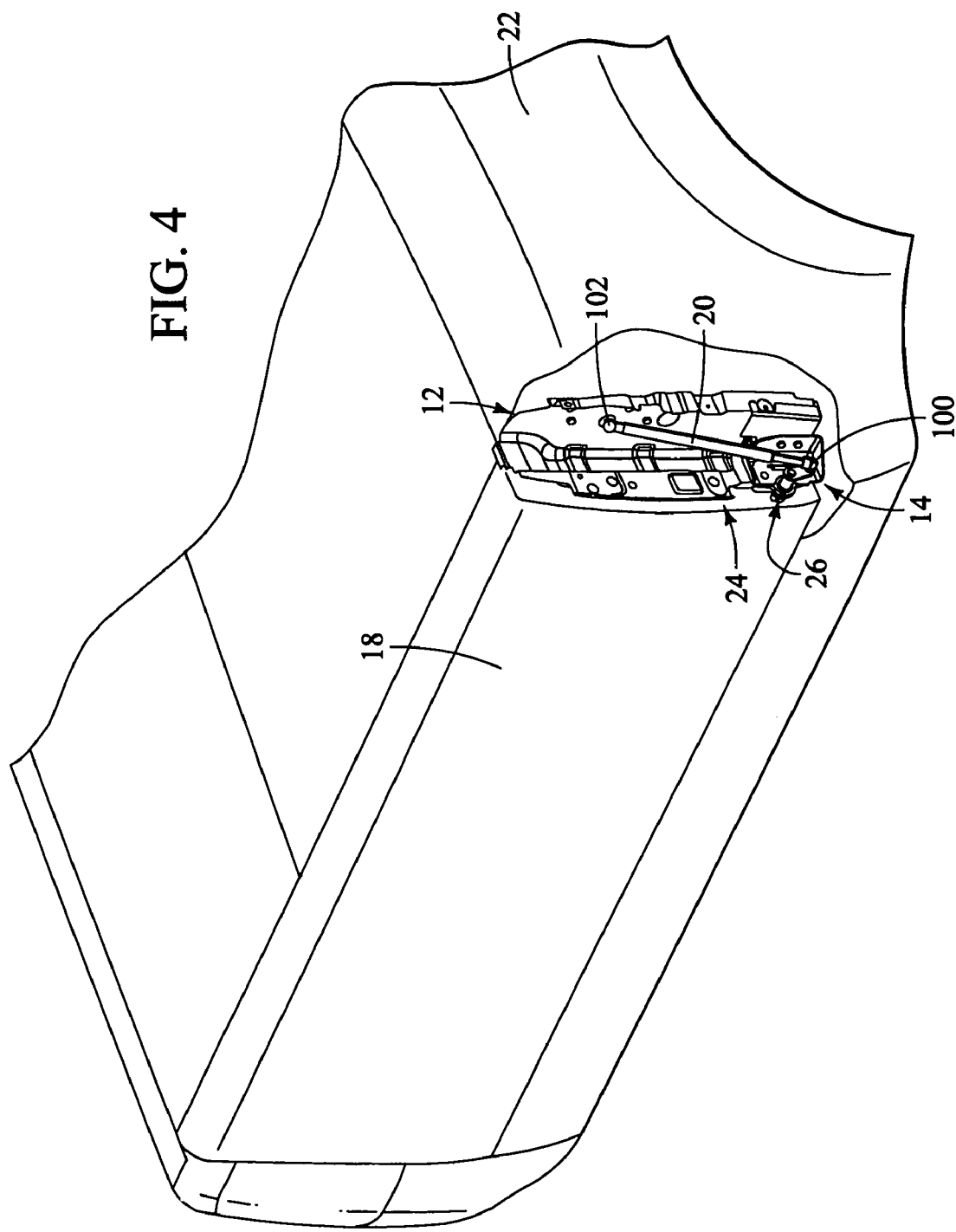
FIG. 4 is a perspective view of the vehicle with a tailgate in a closed position, with a portion of a side panel cutaway to reveal the taillight receiving recess and the lift assist device in an extended state in accordance with the present invention.

In FIG. 4, a portion of the side panel 22 has been cutaway revealing the full interior and depth of the taillight receiving recess 24. Further, the entire lift assist device 20 is exposed as a result of removing the cutaway portion of the side panel 22. It should be understood that at least a portion or all of the side panel 22 has also been cutaway to expose the taillight receiving recess 24 in FIGS. 4-15.

As shown in FIGS. 6-9, the taillight receiving recess 24 basically includes a first wall 28 and a second wall 30. The first wall 28 and the second wall 30 are preferably generally perpendicular to one another. The first and second walls 28 and 30 basically define the taillight receiving recess 24 along with the side panel 22. The first and second walls 28 and 30 include surfaces inner surfaces 28a and 30a, respectively. The surfaces 28a and 30a are both within the taillight receiving recess 24. Further, the surface 30a of the second wall 30 is a rearwardly facing surface with respect to the vehicle 10.

Figure 9:
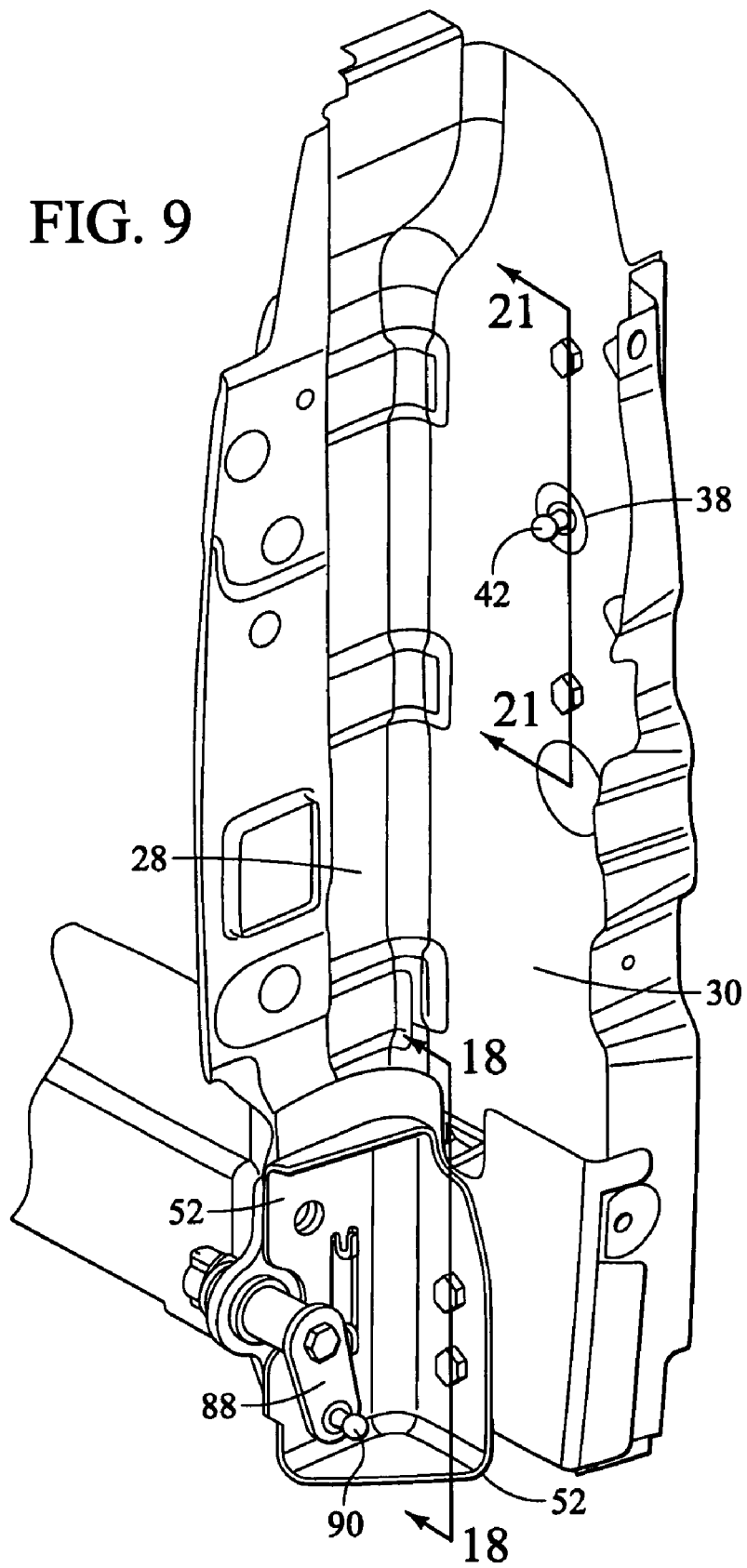
FIG. 9 is a perspective view of the rear corner of the vehicle, with the side panel completely removed to reveal the entire taillight receiving recess in accordance with the present invention.
Figure 10:
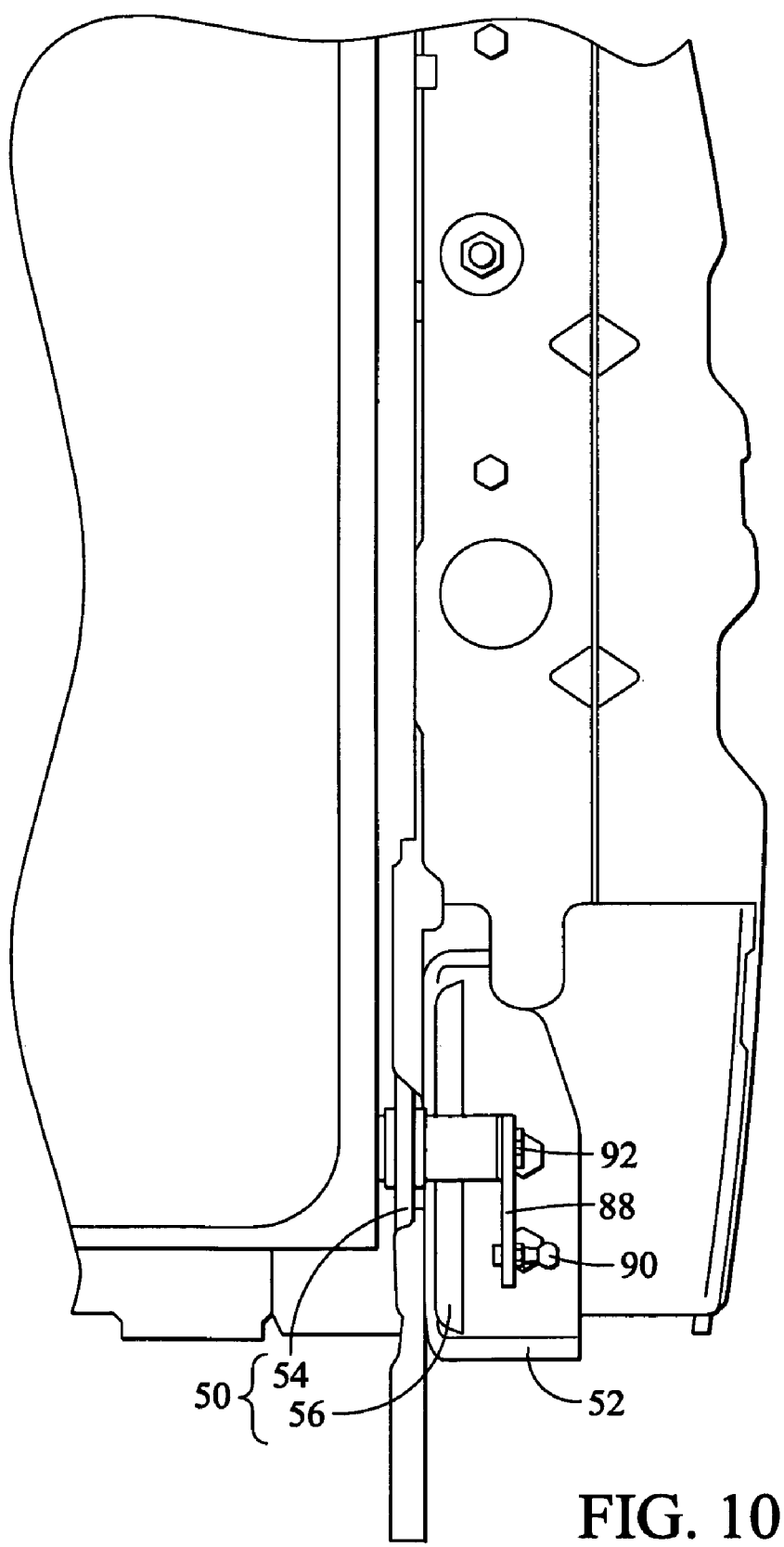
FIG. 10 is a rear end elevational view of the rear corner of the vehicle with the side panel removed to provide greater detail, showing the tailgate and portions of the taillight receiving recess in accordance with the present invention.
Figure 11:
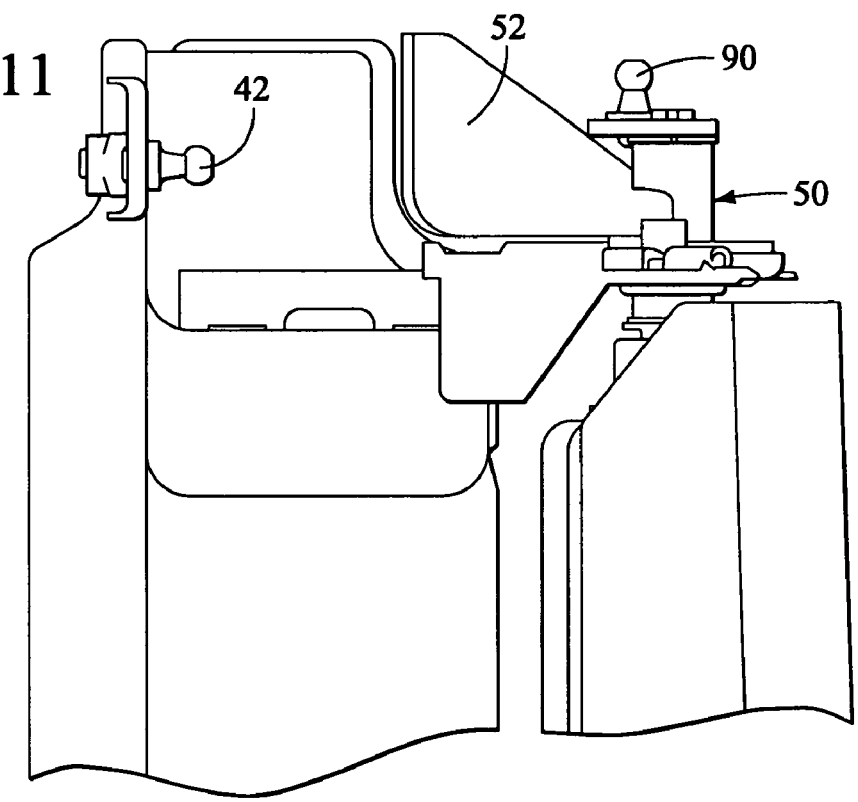
FIG. 11 is a top plan view of the rear corner of the vehicle with selected portions removed to provide greater detail of the taillight receiving recess in accordance with the present invention.
Figure 12:
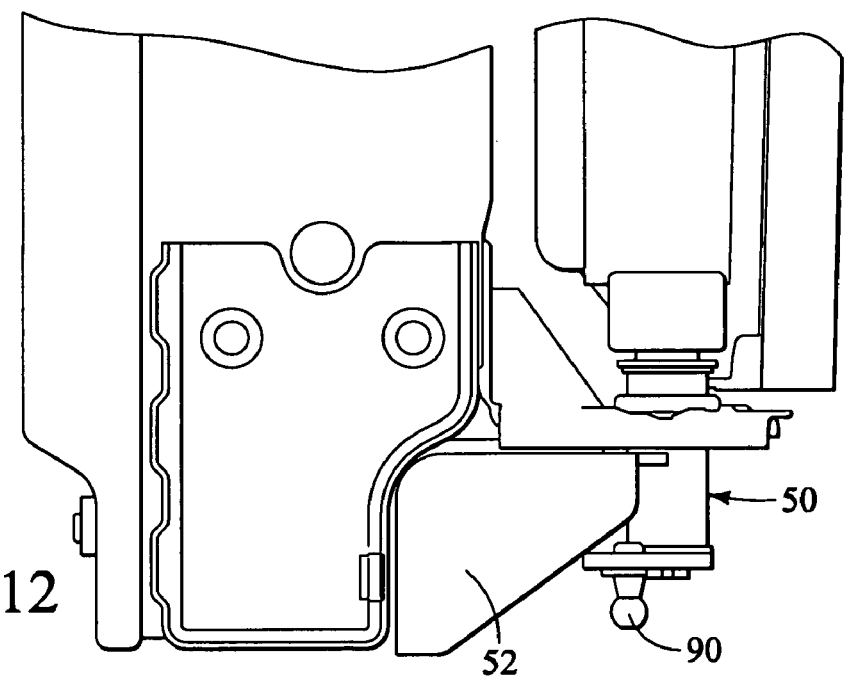
FIG. 12 is a bottom plan view of the rear corner of the vehicle with selected portions removed to provide greater detail of the taillight receiving recess in accordance with the present invention.
Figure 13:
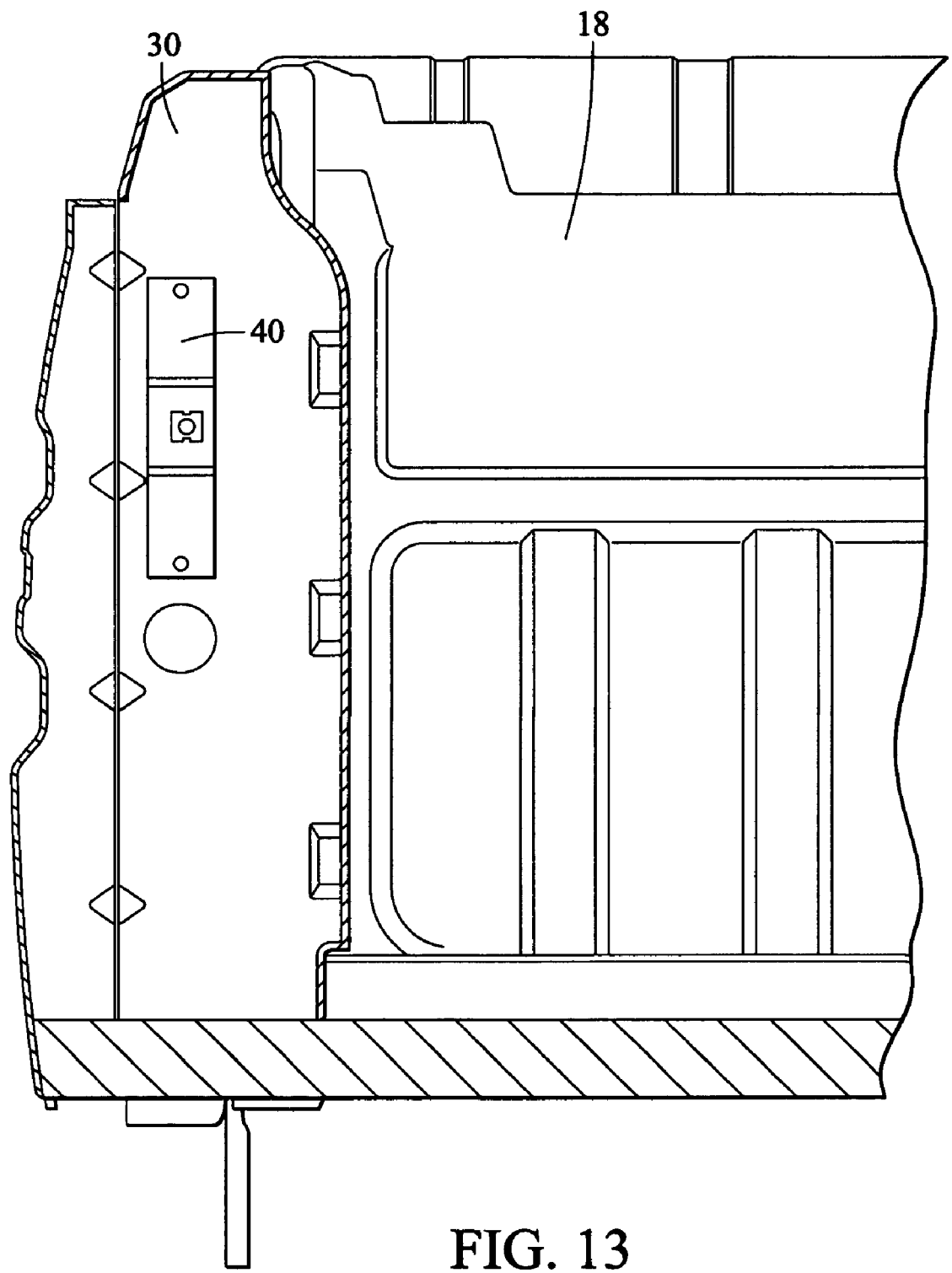
FIG. 13 is a partial cross sectional view of a portion of the truck bed of the vehicle, showing the tailgate and a wall that defines the taillight receiving recess in accordance with the present invention.
Figure 14:
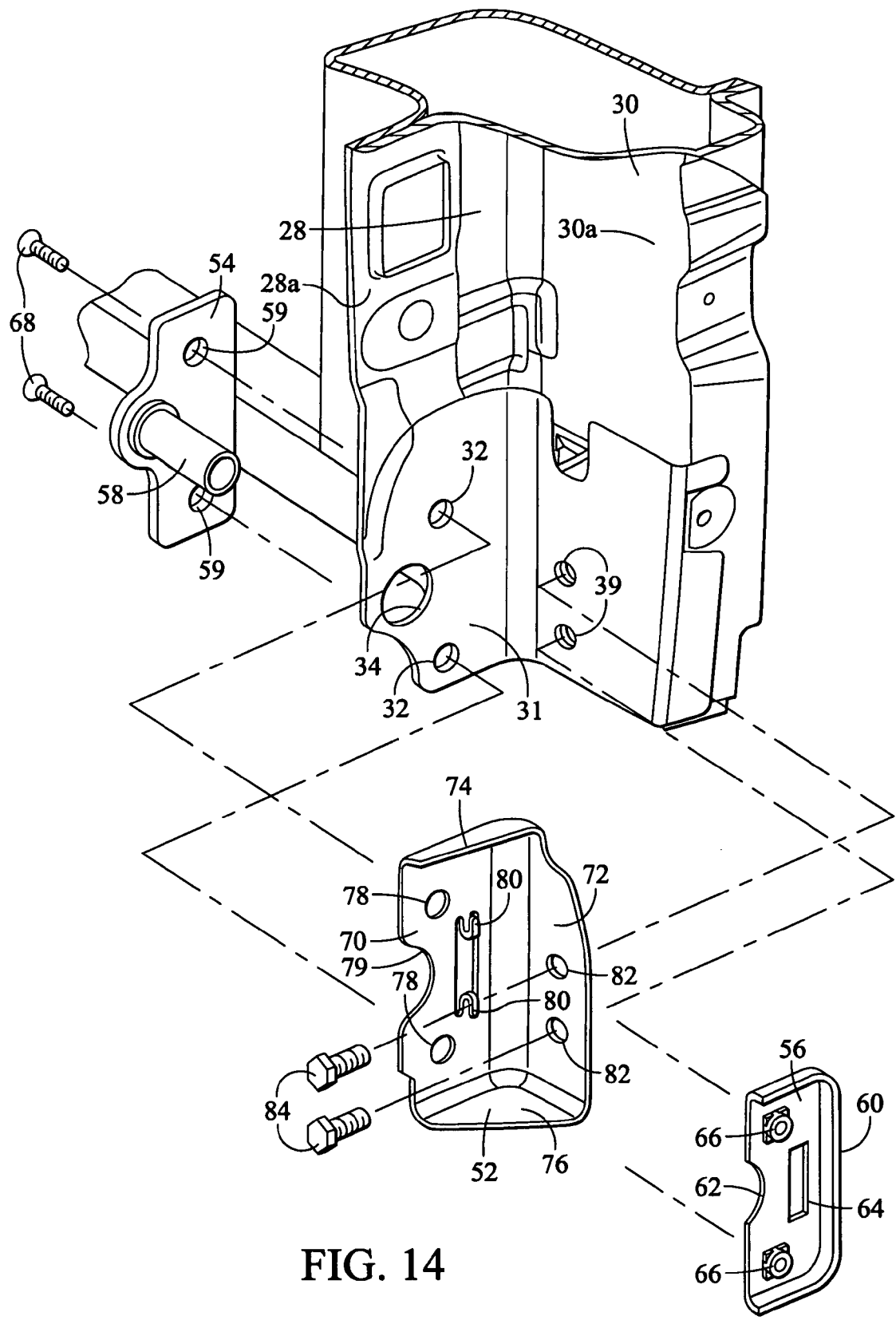
FIG. 14 is an exploded perspective view of a tailgate hinge structure in the lower portion of the taillight receiving recess in accordance with the present invention.

As shown in FIG. 14, the first wall 28 includes a lower portion 31 that is formed with two apertures 32 and an opening 34 that are vertically offset from one another. The opening 34 is vertically positioned between the two apertures 32 but is horizontally offset from the two apertures 32. As shown in FIG. 9, an upper portion of the second wall 30 is formed with two small threaded apertures 36 and a large aperture 38 that are vertically offset from one another with the large aperture 38 in between the two small apertures 36. As shown in FIG. 14, a lower portion of the second wall 30 is formed with two threaded apertures 39.

Figure 15:
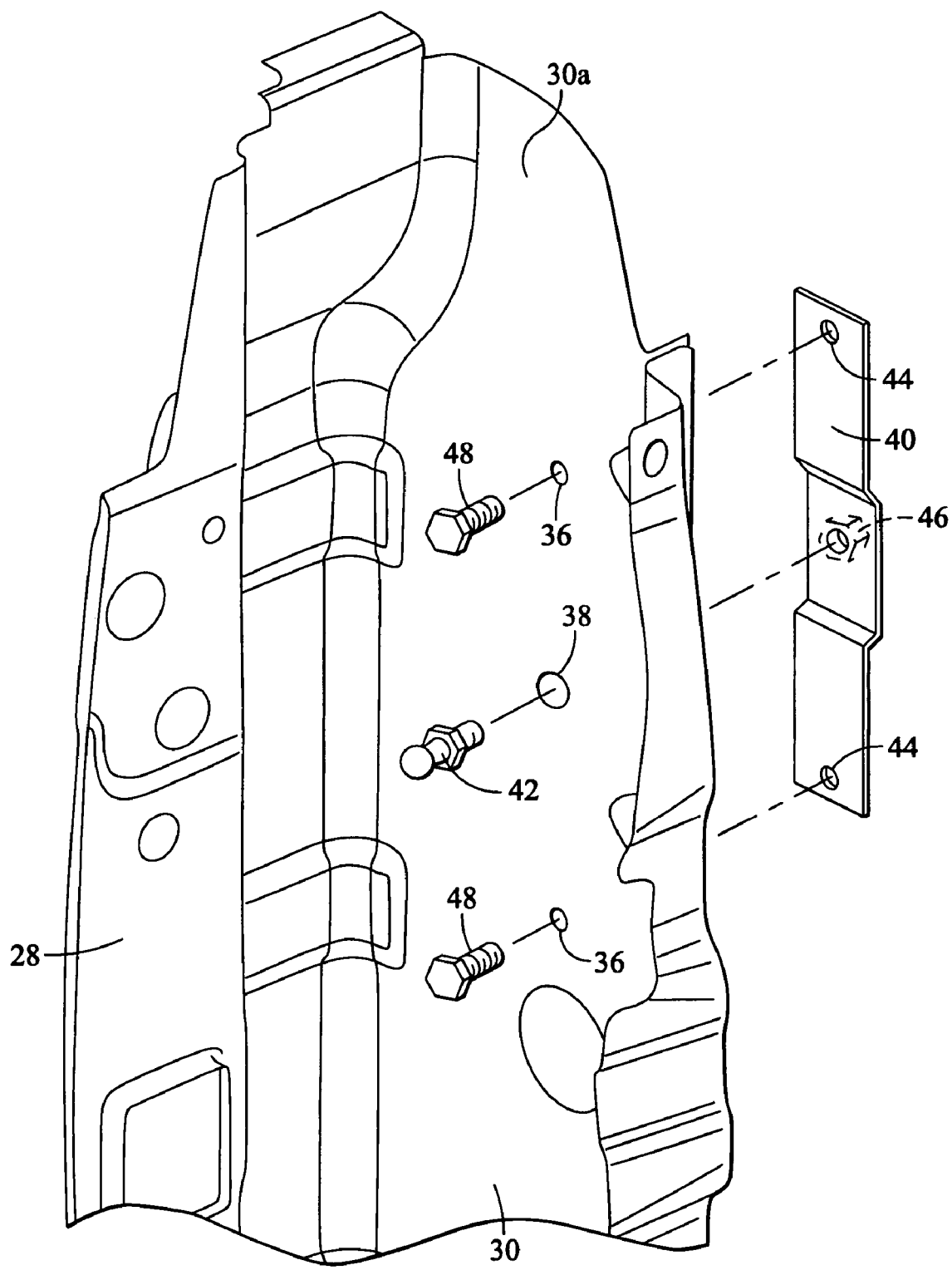
FIG. 15 is an exploded perspective view of a portion of the lift assist support structure in an upper portion of the taillight receiving recess with the side panel omitted to provide greater detail, in accordance with the present invention.
Figure 16:
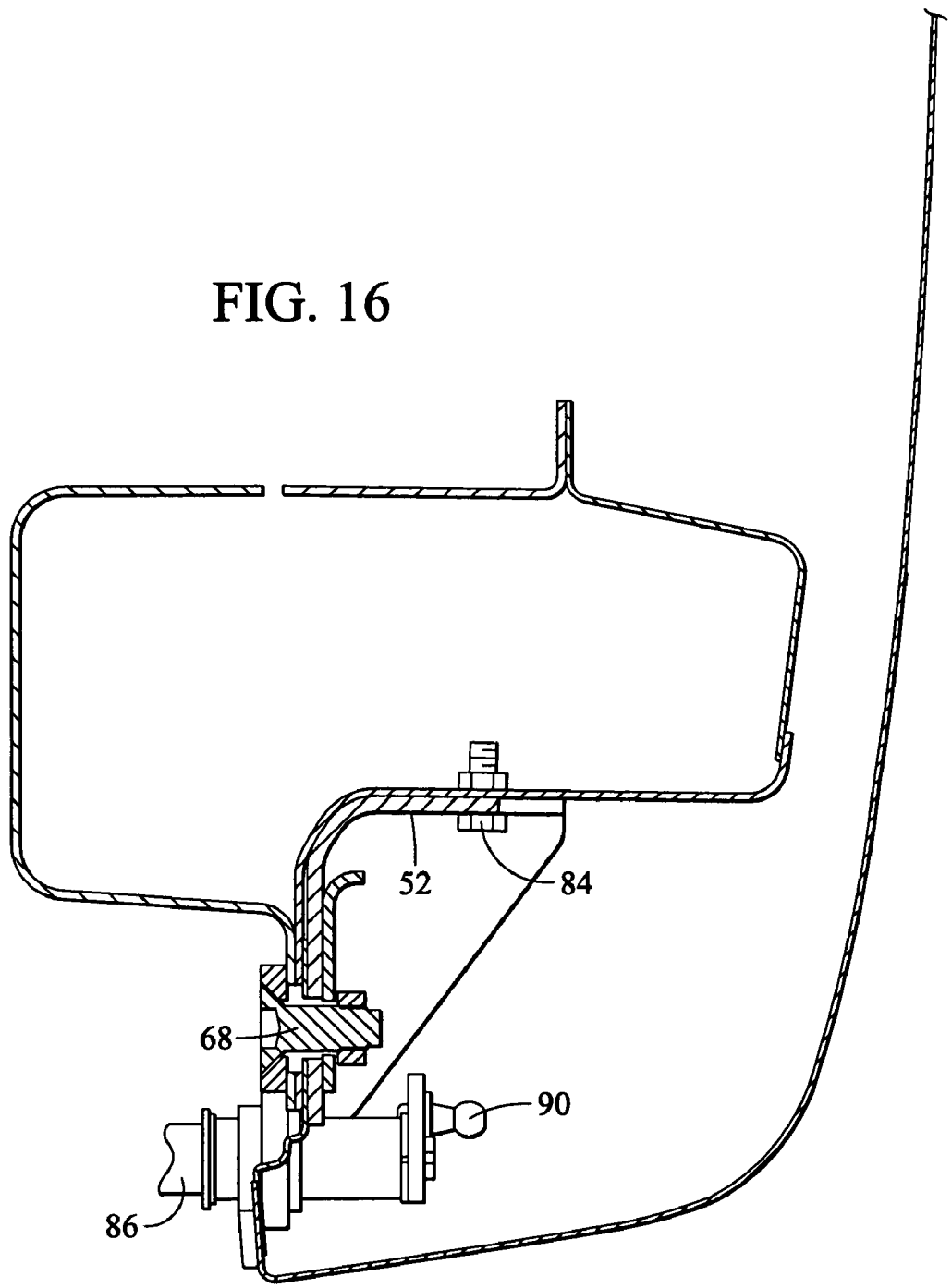
FIG. 16 is a cross sectional view of the rear corner of the vehicle taken along the line 16-16 in FIG. 8, in accordance with the present invention.
Figure 17:
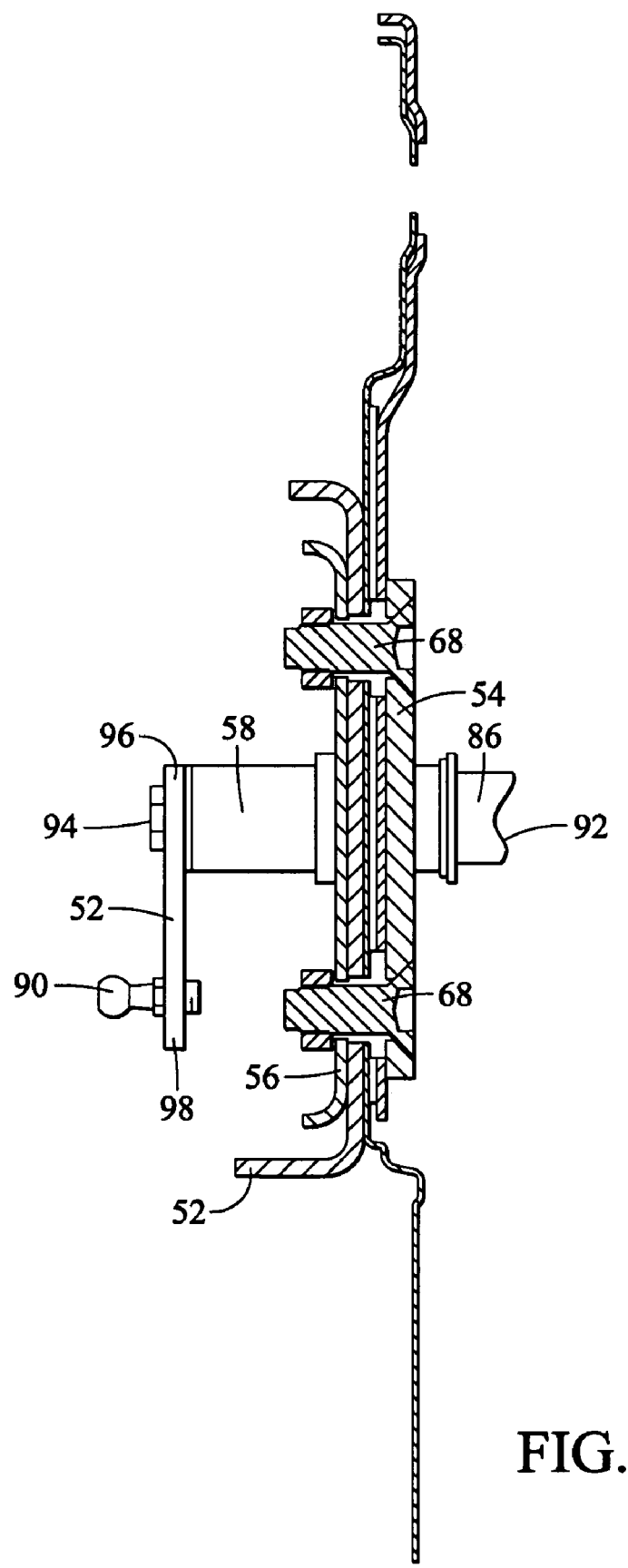
FIG. 17 is a cross sectional view of the rear corner of the vehicle taken along the line 17-17 in FIG. 8, in accordance with the present invention.
Figure 18:
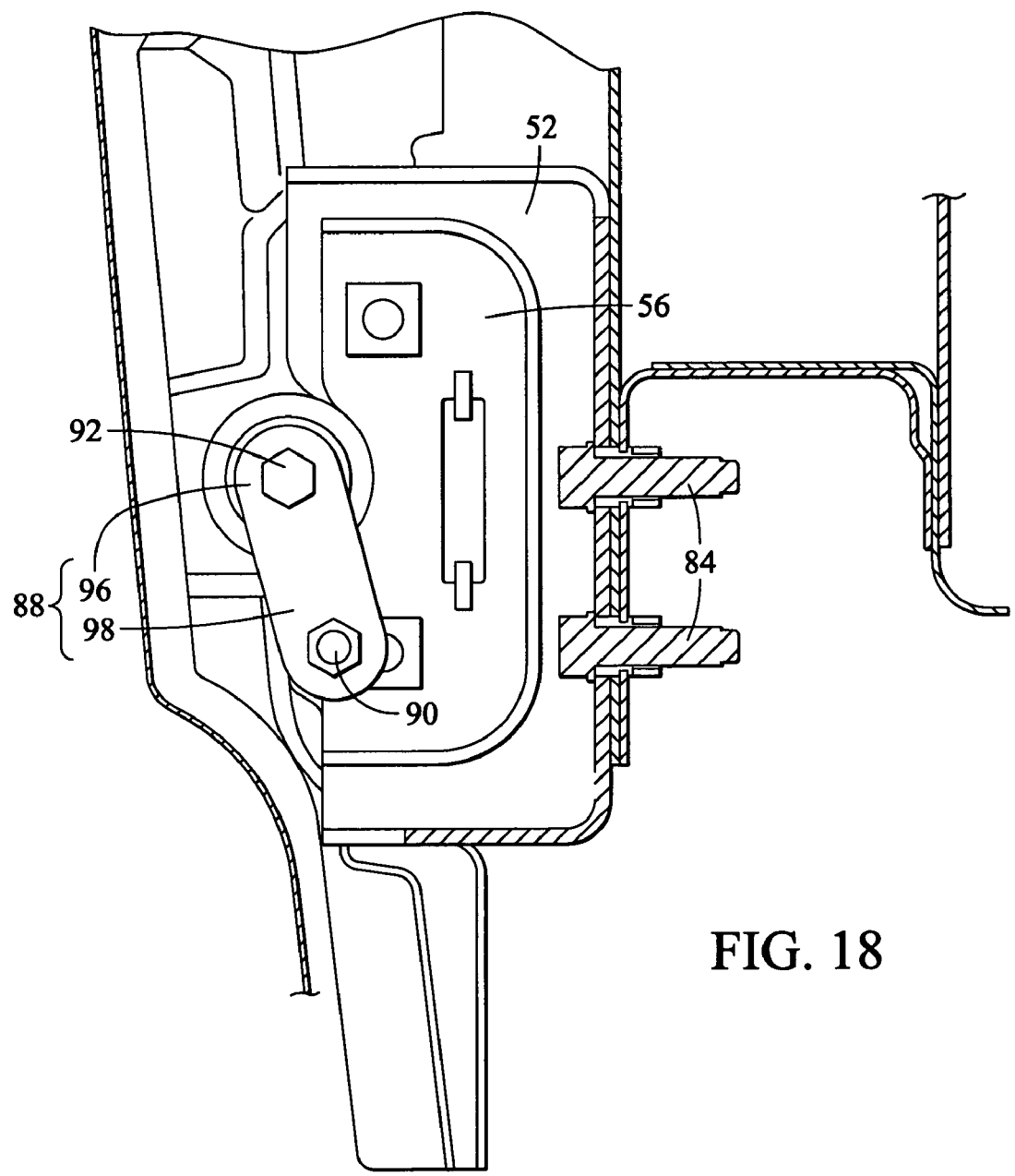
FIG. 18 is a cross sectional view of the rear corner of the vehicle taken along the line 18-18 in FIG. 9, in accordance with the present invention.

As shown in FIG. 15, a portion of the second wall 30 includes a supporting plate 40. The supporting plate 40 includes an attachment pin 42 and two apertures 44. The attachment pin 42 is fixed to the supporting plate 40 by a threaded nut 46. Two bolts 48 extend through the apertures 36 in the second wall 30 and into the apertures 44 thereby securing the supporting plate 40 to the second wall 30. With the supporting plate 40 attached to the second wall 30, the attachment pin 42 extends through the large aperture 38 in the second wall 30 and the taillight receiving recess 24. The supporting plate 40 covers the aperture 38 thereby forming a part of the surface 30a. Thus, the attachment pin 42 is supported on the second wall 30, an interior surface of the taillight receiving recess 24. The attachment pin 42 serves as a connection point for the lift assist device 20, as described further below.

As should be clear from the drawings and the description below, the lift assist device 20 generates forces in response to opening and closing of the tailgate assembly 16. A portion of those forces are transmitted to the attachment pin 42, the supporting plate 40 and the second wall 30. The supporting plate 40 provides reinforcement to the second wall 30 in order to withstand forces generated by the lift assist device 20 in response to opening and closing of the tailgate assembly 16.

The tailgate support structure 26 is now described with respect to FIGS. 6-14. The tailgate support structure 26 includes a tailgate hinge 50 and a hinge reinforcement bracket 52. The tailgate hinge 50 and the hinge reinforcement bracket 52 along with adjacent portions of the taillight receiving recess 24 are configured and arranged to withstand opening and closing forces generated by the lift assist device 20 in response to opening and closing of the tailgate assembly 16, as described in greater detail below.

Figure 5:
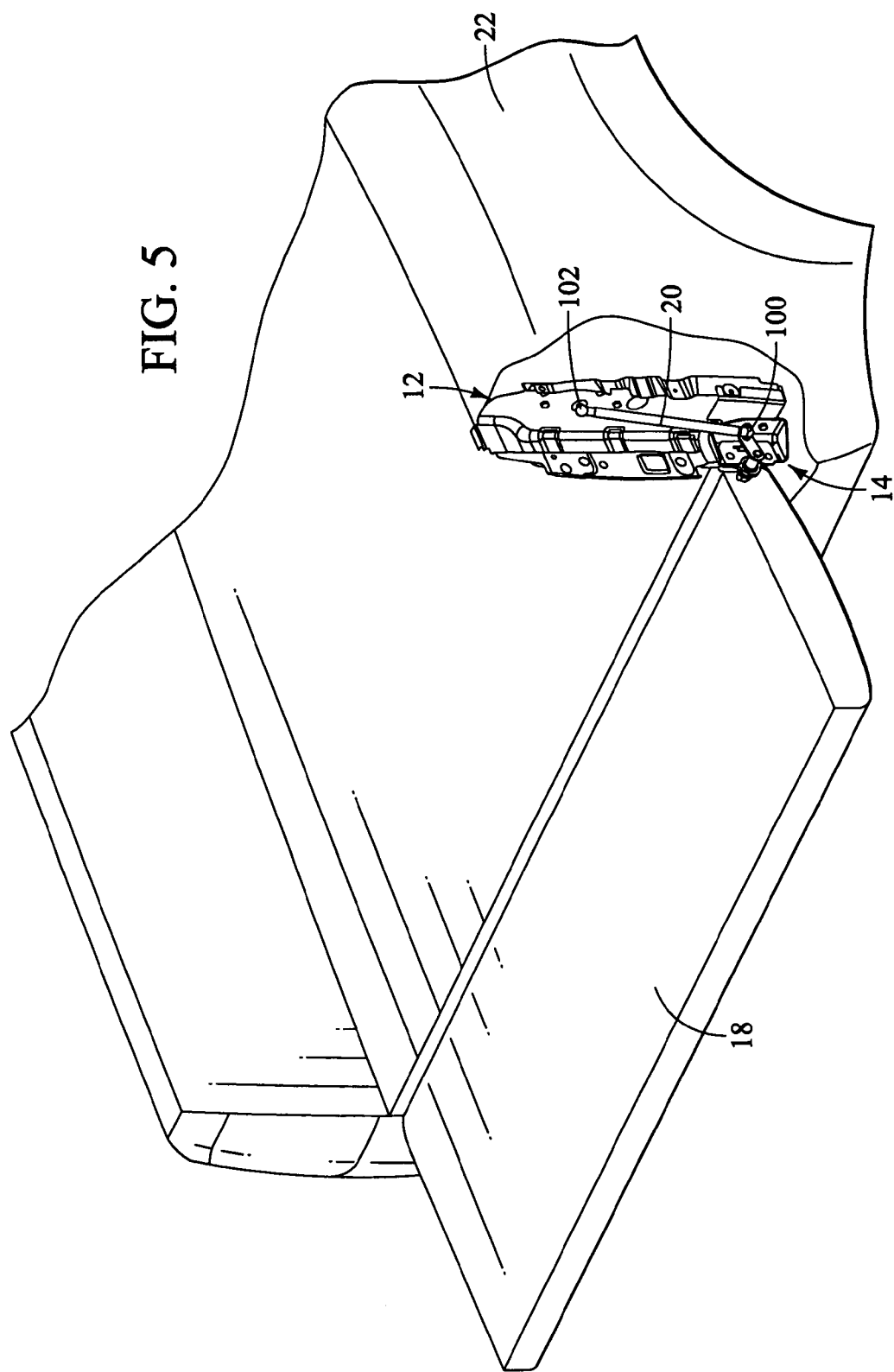
FIG. 5 is a perspective view of the vehicle with the tailgate in an open position, with a portion of a side panel cutaway to reveal the taillight receiving recess and the lift assist device in a compressed state in accordance with the present invention.

As shown in FIG. 14, the tailgate hinge 50 includes a hinge plate 54 and a floating nut plate 56. As shown in FIG. 14, the hinge plate 54 basically includes a pivot bearing sleeve 58 and a pair of bolt holes 59. The pivot bearing sleeve 58 defines a tailgate pivot axis A (see FIG. 19) about which the taillight assembly 16 pivots from a closed position (FIG. 4) to an open position (FIG. 5). More specifically, the pivot bearing sleeve 58 forms a rotary joint about the tailgate pivot axis A for pivoting movement of the tailgate assembly 16. When installed, the bearing sleeve 58 extends through the opening 34 in the first wall 28.

The floating nut plate 56 is a generally flat member that basically includes a side gusset 60, an arcuate recess 62, a rectangular opening 64 and two fixed threaded nuts 66. The side gusset 60 extends around three sides of the floating nut plate 56. The arcuate recess 62 is sufficiently large to avoid interference with positioning of the pivot bearing sleeve 58. Two bolts 68 secure the hinge plate 54 to the floating plate 56 with the lower portion 31 of the first wall 28 clamped therebetween, as described in greater detail below.

Referring again to FIG. 14, the hinge reinforcement bracket 52 is now described. The hinge reinforcement bracket 52 is completely disposed within the taillight receiving recess 24 and is directly attached to the first and second walls 28 and 30 (two generally perpendicular surfaces). The hinge reinforcement bracket 52 basically includes a first reinforcing part 70, a second reinforcing part 72, an upper brace 74 and a lower brace 76. Preferably, the hinge reinforcement bracket 52 is formed unitarily from a single piece of metal, but may be formed as separate elements welded together.

The first reinforcing part 70 includes a pair of vertically spaced apart bolt holes 78, an arcuate recess 79 and a pair of support hooks 80 formed adjacent to the bolt holes 78. The bolt holes 78 and the apertures 32 in the lower portion 31 of the first wall 28 are larger than the bolt holes 59 in the hinge plate 54. As indicated in FIG. 14, the bolts 68 are installed in the bolt holes 59 in the hinge plate 54 and extend through the apertures 32 in the lower portion 31 of the first wall 28. The bolts 68 further extend through the bolt holes 78 in the first reinforcing part 70 and are then threaded into the fixed threaded nuts 66 in the floating nut plate 56. Since the bolt holes 78 and the apertures 32 are larger than the bolt holes 59 in the hinge plate 54, the hinge plate 54 and the floating nut plate 56 can be moved relative to the first wall 28 and the hinge reinforcement bracket 52. Hence, the position of the vehicle tailgate 18 can be adjusted by loosening the bolts 68, repositioning the hinge plate 54 and floating nut plate 56 and re-tightening the bolts 68. With the bolts 68 tightened, the hinge plate 54, first reinforcing part 70 of the hinge reinforcement bracket 52 and floating nut plate 56 are fixed or attached to the first wall 28. More specifically, with the bolts 68 tightened, the hinge plate and the floating nut plate are urged toward one another clamping the hinge reinforcement bracket 52 and the lower portion 31 of the first wall 28 therebetween. The arcuate recess 79 is sufficiently large to avoid interference with positioning of the pivot bearing sleeve 58.

The pair of support hooks 80 are configured and arranged to extend through the rectangular opening 64 in the floating nut plate 56. The hinge reinforcement bracket 52 and the floating nut plate 56 are completely disposed within the taillight receiving recess 24. Consequently, the hinge reinforcement bracket 52 and the floating nut plate 56 are completely concealed with the taillight assembly 16 installed in the taillight receiving opening 23. However, if the bolts 68 are removed, the floating nut plate 56 is held in position by the pair of support hooks 80. It is therefore safe to remove the bolts 68 and easily reinstall them, if necessary for any reason.

The second reinforcing part 72 is preferably formed generally perpendicular to the first reinforcing part 70. The second reinforcing part 72 of the hinge reinforcement bracket 52 is formed with a pair of bolt holes 82 that receive a pair of bolts 84. The bolts 84 extend through the bolt holes 82 and thread into the threaded apertures 39 in the second wall 30. The bolts 84 removably attach the hinge reinforcement bracket 52 to the second wall 30. With the bolts 84 securing second reinforcing part 72 of the hinge reinforcement bracket 52 to the second wall 30, the hinge reinforcement bracket 52 remains fixed in position even when the bolts 68 are removed from the first reinforcing part 70 of the hinge reinforcement bracket 52 and floating nut plate 56.

The upper brace 74 of the hinge reinforcement bracket 52 is preferably formed generally perpendicular to both the first reinforcing part 70 and the second reinforcing part 72 reinforcing the strength therebetween. The lower brace 76 of the hinge reinforcement bracket 52 is also preferably formed generally perpendicular to both the first reinforcing part 70 and the second reinforcing part 72 providing reinforcement of the strength therebetween.

Figure 6:
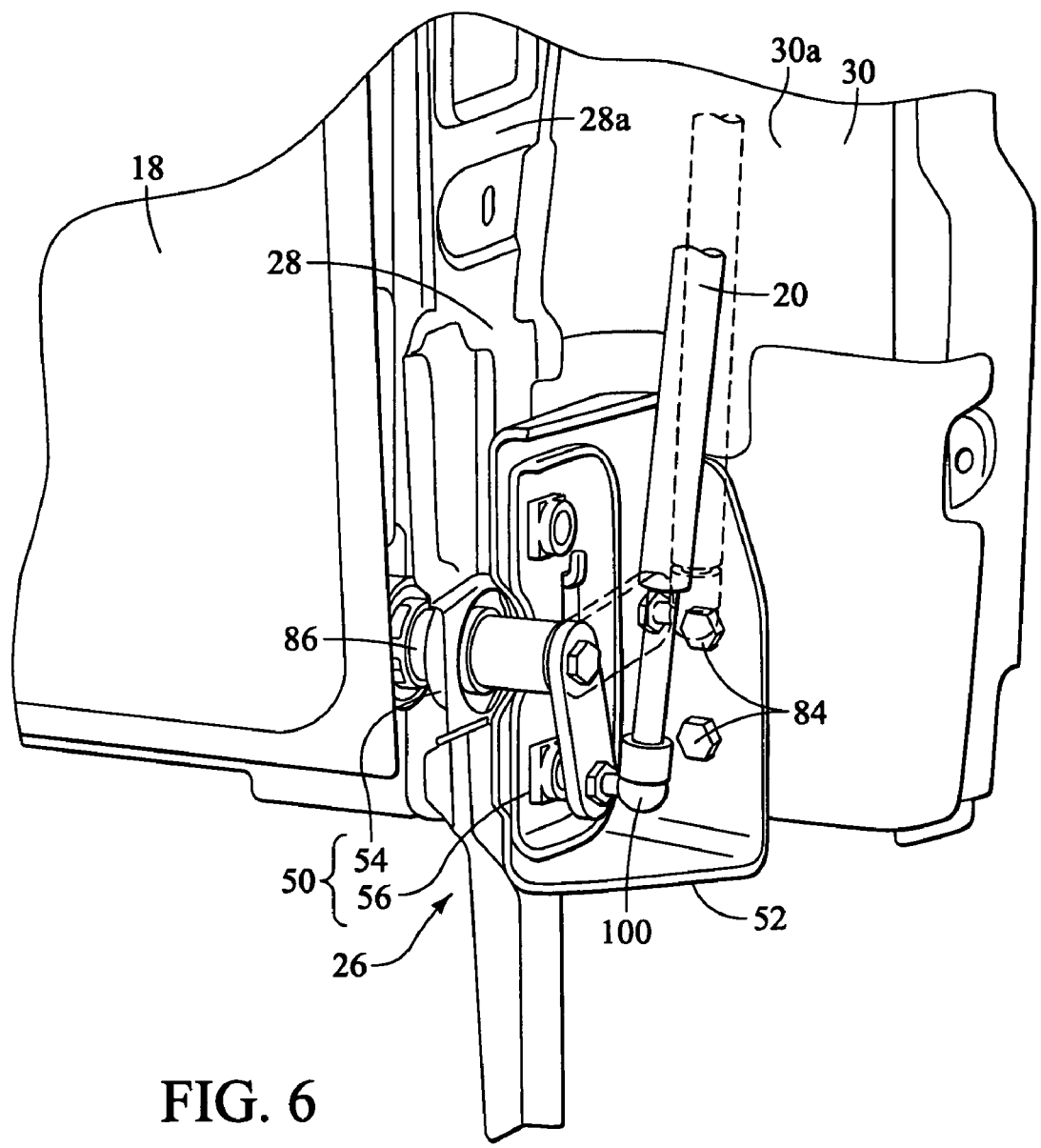
FIG. 6 is a perspective view of the rear of the vehicle with the portion of the side panel removed to reveal the lower portion of the taillight receiving recess and a lower portion of a lift assist device in accordance with the present invention.
Figure 7:
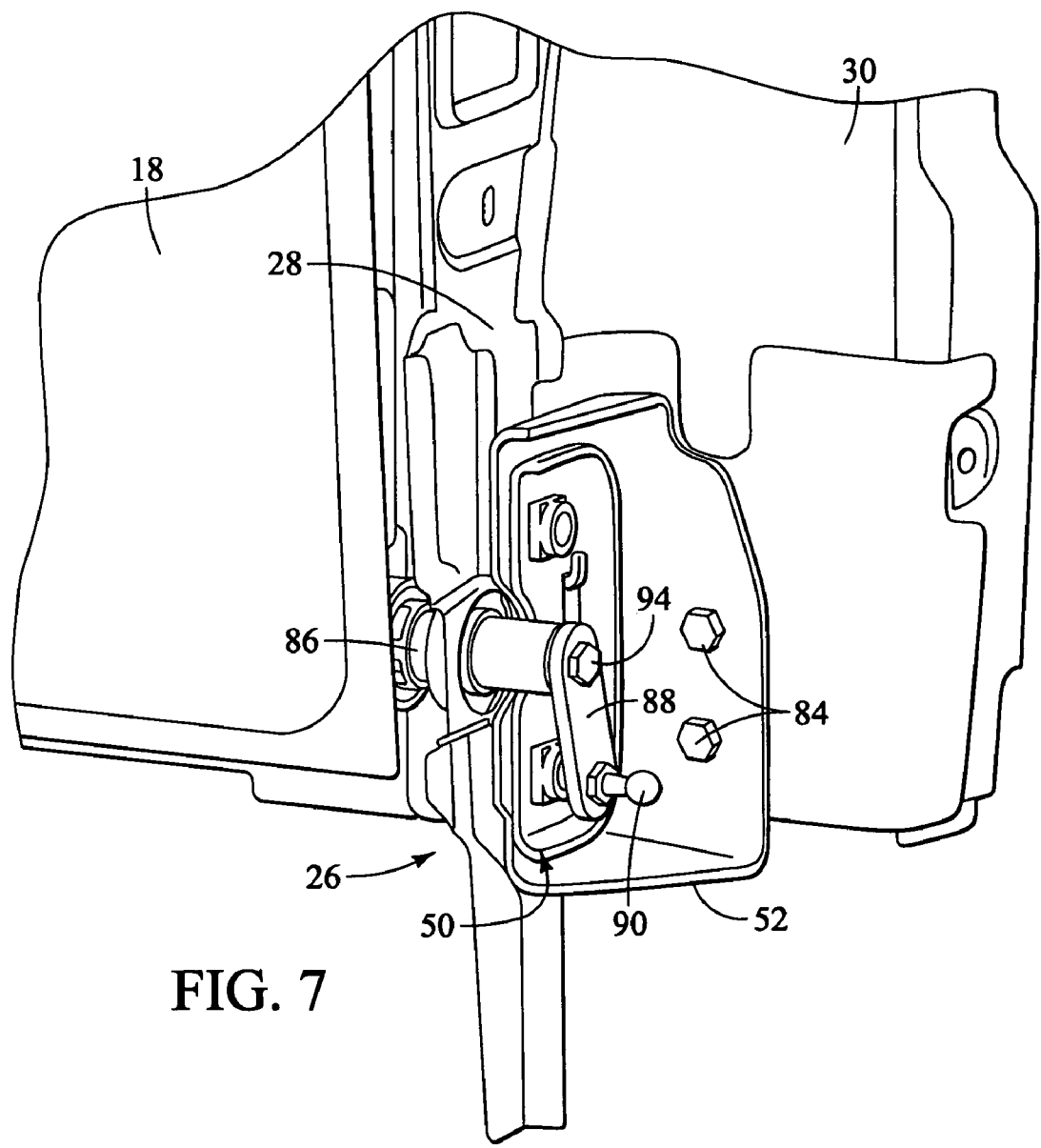
FIG. 7 is another perspective view, similar to FIG. 6, with the side panel and the lift assist device removed to provide greater detail in accordance with the present invention.
Figure 8:
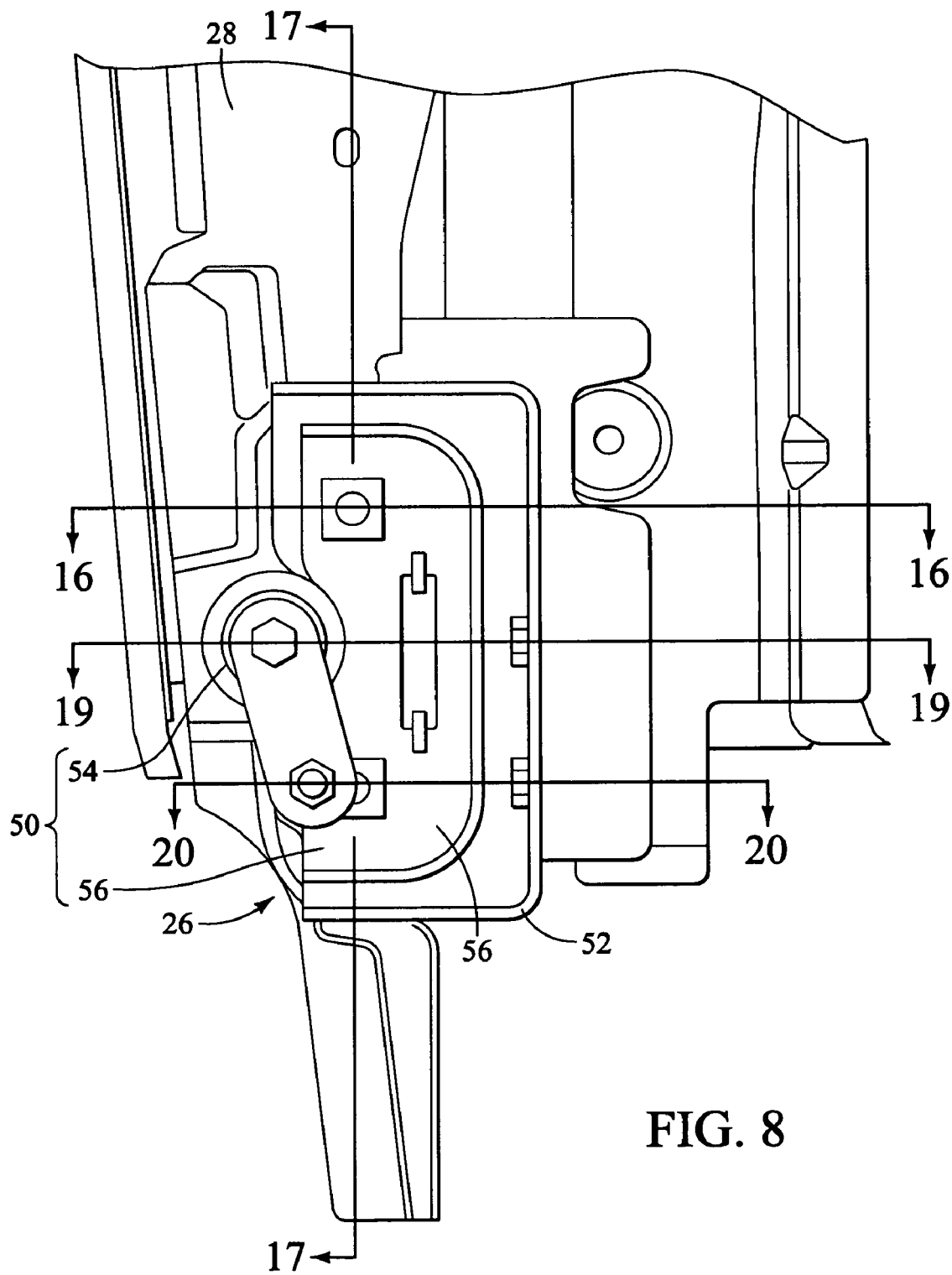
FIG. 8 is a side elevational view of the lower portion of the taillight receiving recess with the side panel removed to provide greater detail in accordance with the present invention.
Figure 19:
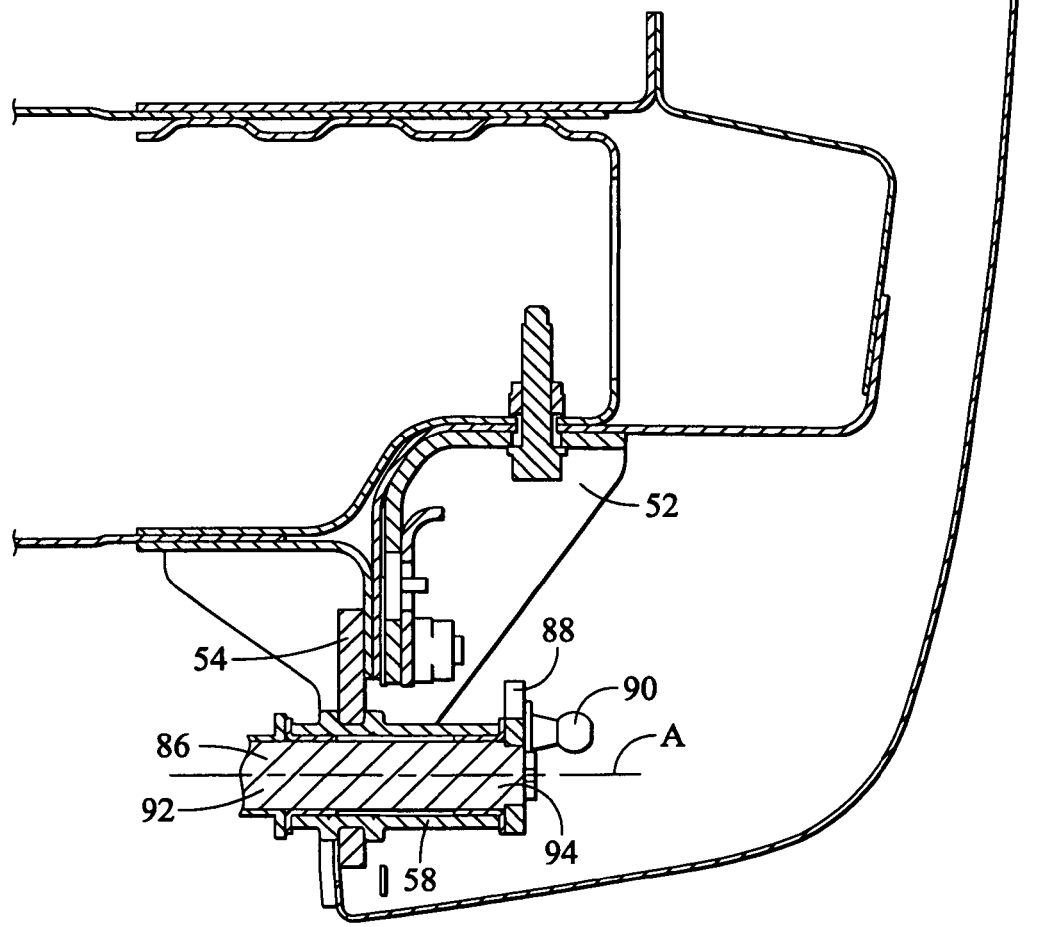
FIG. 19 is a cross sectional view of the rear corner of the vehicle taken along the line 19-19 in FIG. 8, in accordance with the present invention.
Figure 20:
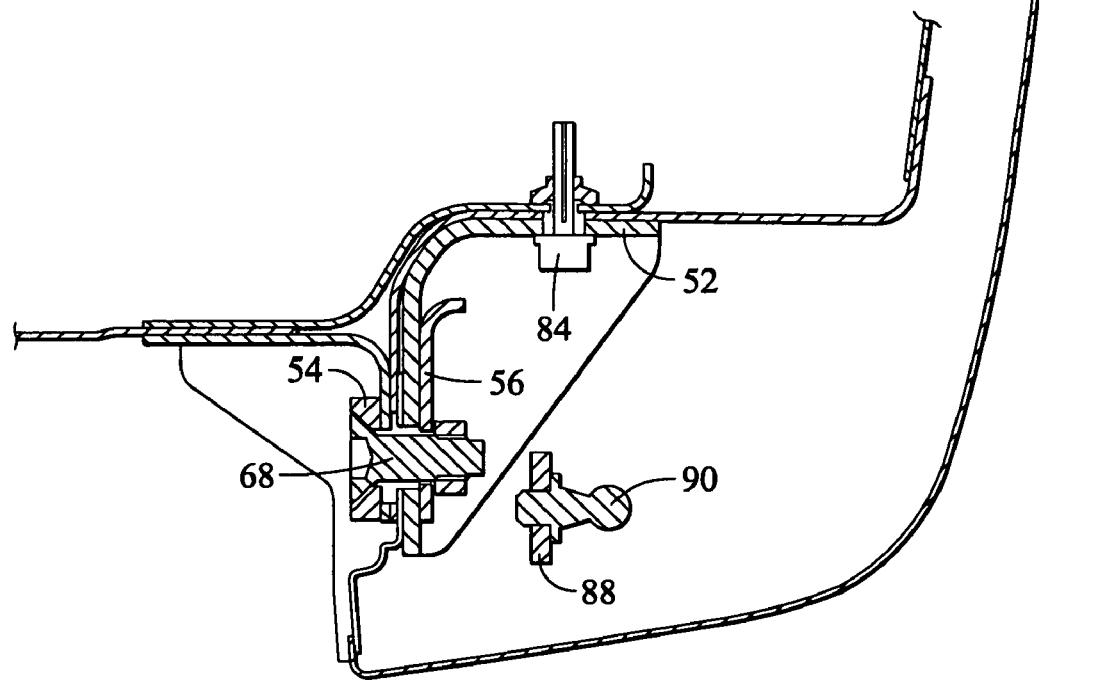
FIG. 20 is a cross sectional view of the rear corner of the vehicle taken along the line 20-20 in FIG. 8, in accordance with the present invention.
Figure 21:
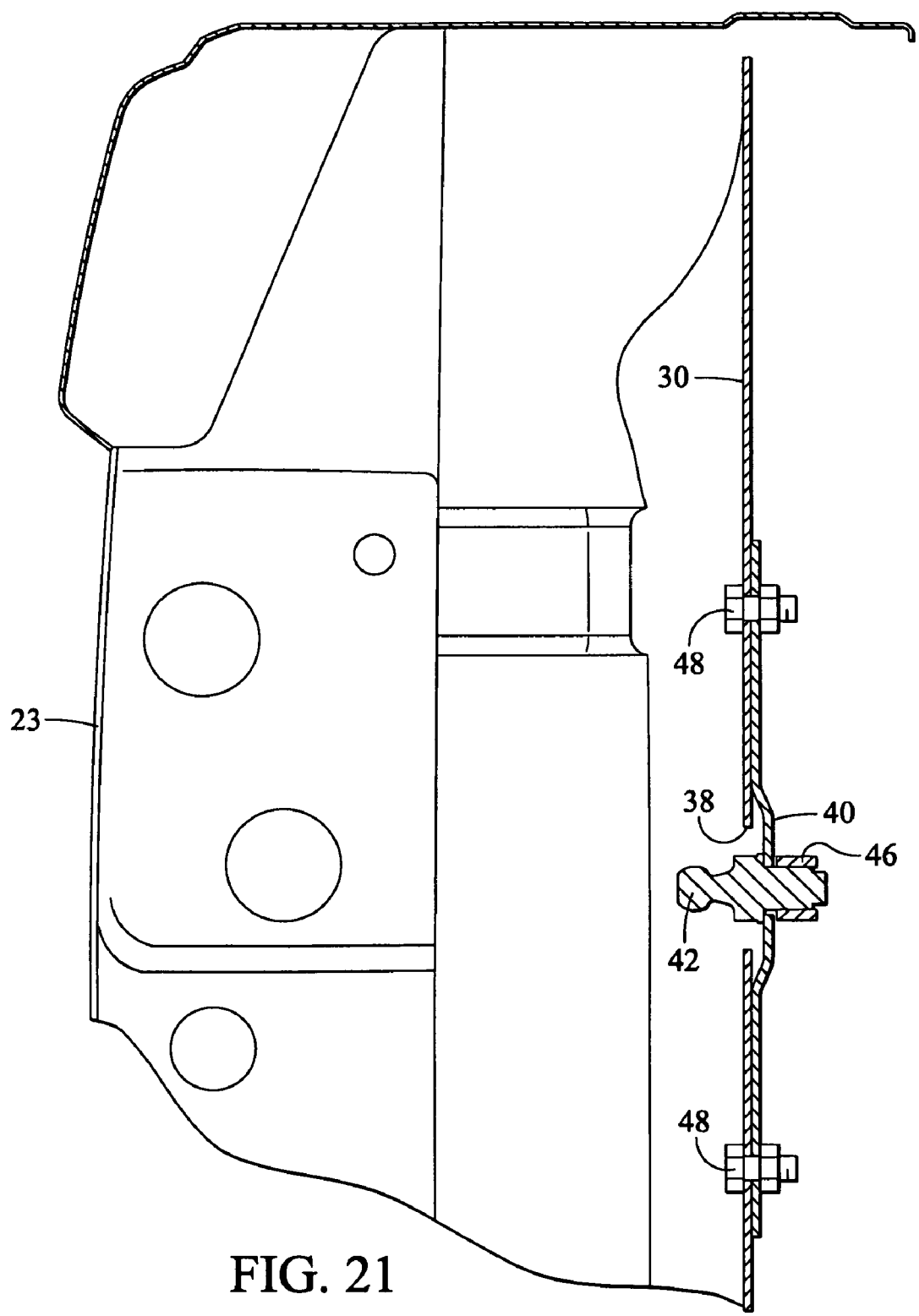
FIG. 21 is a cross sectional view of the rear corner of the vehicle taken along the line 21-21 in FIG. 9, in accordance with the present invention.

The vehicle tailgate 18 is now described in greater detail with respect to FIGS. 6 and 16-20. The vehicle tailgate 18 is pivotally coupled to the tailgate support structure 26 to open and close by rotation about the tailgate pivot axis A. As shown in FIG. 6, the vehicle tailgate 18 basically includes a pivot pin 86, a bellcrank arm 88 and an attachment pin 90. As shown in FIG. 19, the pivot pin 86 has a first end 92 and a second end 94. It should be understood from the disclosure and the drawings that the vehicle tailgate 18 is supported by two pivot pins, one on each side of the rear of the vehicle 10. However, only one pivot pin 86 is described herein as it relates to the use of the lift assist device 20 and the corresponding vehicle tailgate lift assist support structure 12.

The first end 92 of the pivot pin 86 is attached or removably coupled to the vehicle gate 18, as shown in FIG. 6. It should be understood, that in conventional pickup trucks, the tailgate is often removable from the rear of the pickup truck. Although not shown, the pivot pin 86 and vehicle tailgate 18 can be configured for easy separation. Alternatively, the first end 92 of the pivot pin 86 can be fixedly attached to the vehicle tailgate 86.

The pivot pin 86 extends from vehicle tailgate 18 into taillight receiving recess 23 through a hollow interior of the pivot bearing sleeve 58, as shown in FIG. 19 and indicated in FIG. 6. The second end 94 of the pivot pin 86 is attached to the bellcrank arm 88. It should be noted that the pivot pin 86 is not shown in FIG. 14.

The bellcrank arm 88 is a generally flat elongated member having a first end 96 and a second end 98. The first end 96 of a bellcrank arm 88 is fixedly and rigidly attached to the second end 94 of the pivot pin 86 such that the bellcrank arm 88 moves with the pivot pin 86 and consequently with the vehicle tailgate 18. The attachment pin 90 is fixed to the second end 98 of the bellcrank arm 88, as shown in FIGS. 6 and 16-20. The second end 94 of the bellcrank arm 88 and the attachment pin 90 are offset from the tailgate pivot axis A. As indicated in the drawings, the second end 94 of the bellcrank arm 88 and the attachment pin 90 are located on a rearward side of the rearwardly facing surface 30a of the second wall 30. The attachment pin 90 extends in a direction that is generally parallel to the to tailgate pivot axis A and is disposed in the taillight receiving recess 24 where it supports the lift assist device 20, as described in greater detail below. The attachment pin 90 also extends in a direction that is generally perpendicular to the direction of the first attachment pin 42.

The lift assist device 20 is now described with specific reference to FIGS. 3-6. The lift assist device 20 is an energy absorbing device that is preferably a pneumatic cylinder that can also include an internal biasing spring (not shown). As shown in FIG. 4, with the vehicle tailgate 18 closed, the lift assist device 20 is in an extended orientation. As shown in FIG. 5, when the vehicle tailgate 18 is opened, the lift assist device 20 is compressed absorbing energy and cushioning the opening movement of the vehicle tailgate 18. Specifically, the lift assist device 20 absorbs a portion of the force generated as gravity pulls the vehicle tailgate 18 to its open position. The forces acting on the lift assist device 20 are transmitted to two specific areas of the vehicle tailgate lift assist support structure 12. Specifically, the forces are transmitted to the tailgate hinge 50 and the supporting plate 40 mounted to the second wall 30 of the taillight receiving recess 24. In other words, the lift assist device 20 is configured to dampen opening movement of the vehicle tailgate 18 relative to the vehicle rear end structure 14 and to apply a closing torque to the tailgate hinge 50 during closing movement of the vehicle tailgate 18 relative to the vehicle rear end structure 14.

Preferably, the lift assist device 20 is configured to apply a closing force of at least about 115 Newtons. Clearly, the tailgate support structure 26, including the tailgate hinge 50 and the hinge reinforcement bracket 52, are configured and arranged to withstand this closing force.

The lift assist device 20 is located entirely within the taillight receiving recess 24 and basically includes a first connection 100 and a second connection 102 at opposite ends thereof. The first connection 100 first connection of the lift assist device 20 is coupled to the vehicle tailgate 18. More specifically, the first connection 100 is pivotally attached to the attachment pin 90 on the second end 98 of the bellcrank arm 88.

The second connection 102 of the lift assist device 20 is coupled to the attachment pin 42, which is attached to the second wall 30 and forms the rearwardly facing surface 30a. Since the second wall 30 includes the supporting plate 40, the second wall 30 is reinforced in the area adjacent the second connection 102 of the lift assist device 20.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle tailgate lift assist support structure comprising:
   a vehicle rear end structure including a tailgate support structure with a pivot bearing sleeve extending in a lateral vehicle direction and a rearwardly facing surface having a first attachment pin extending in a rearward vehicle direction;
   a vehicle tailgate pivotally coupled to the tailgate support structure to open and close by rotation about a tailgate pivot axis;
   a bellcrank arm including a first end attached to the vehicle tailgate and a second end offset from the tailgate pivot axis with the first end of the bellcrank arm extending through the pivot bearing sleeve of the vehicle rear end structure and the second end of the bellcrank arm having a second attachment pin being located on a rearward side of the rearwardly facing surface, the first and second attachment pins being perpendicularly oriented with respect to each other and the second attachment pin extending parallel with and offset from the tailgate pivot axis; and
   a lift assist device including a first connection coupled to the second attachment pin of the bellcrank arm and a second connection coupled to the first attachment pin of the vehicle rear end structure to dampen opening movement of the vehicle tailgate relative to the vehicle rear end structure and to apply a closing torque to the vehicle tailgate during closing movement of the vehicle tailgate relative to the vehicle rear end structure.

2. The vehicle tailgate lift assist support structure as set forth in claim 1, wherein
   the vehicle tailgate includes a pivot pin with the first end of the bellcrank arm fixed thereto.

3. The vehicle tailgate lift assist support structure as set forth in claim 2, wherein
   the vehicle rear end structure includes a taillight receiving recess with the lift assist device completely disposed within the taillight receiving recess.

4. The vehicle tailgate lift assist support structure as set forth in claim 3, wherein,
   the tailgate support structure includes a tailgate hinge
   the vehicle rear end structure includes a first wall supporting the tailgate hinge and a second wall arranged generally perpendicular to the first wall with the rearwardly facing surface being formed by the second wall to at least partially define the taillight receiving recess.

5. The vehicle tailgate lift assist support structure as set forth in claim 4, wherein
the tailgate hinge includes a hinge plate disposed on an inboard side of the first wall and a nut plate disposed on an outboard side of the first wall for supporting the vehicle tailgate.

6. The vehicle tailgate lift assist support structure as set forth in claim 1, wherein
the lift assist device is configured to apply a closing force of at least about 115 Newtons, and the tailgate support structure includes a tailgate hinge and a hinge reinforcement bracket that are configured and arranged to withstand the closing force.

7. The vehicle tailgate lift assist support structure as set forth in claim 1, wherein
the first attachment pin includes a mounting portion fixedly coupled to the vehicle rear end structure and a ball end rotatably coupled to the second connection of the lift assist device.

8. The vehicle tailgate lift assist support structure as set forth in claim 7, wherein the tailgate support structure further includes a wall forming the rearwardly facing surface and a supporting plate overlying the wall and coupled to the mounting portion of the first attachment pin.

9. The vehicle tailgate lift assist support structure as set forth in claim 1, wherein the second attachment pin includes a mounting portion fixedly coupled to the bellcrank arm and a ball end rotatably coupled to the first connection of the lift assist device.

* * * * *